(12) United States Patent
Feher et al.

(10) Patent No.: US 6,169,277 B1
(45) Date of Patent: Jan. 2, 2001

(54) APPARATUS FOR THE SELECTIVE HEATING OF FOODS DISPOSED ON A TRAY USING A GYROTRON FOR MICROWAVE HEATING OF THE FOODS

(75) Inventors: Lambert Feher, Linkenheim-Hochstetten; Manfred Schnack; Sven Schnack, both of Ritterhude, all of (DE)

(73) Assignee: Forschungszentrum Karlsruhe GmbH, Karlsruhe (DE)

( * ) Notice: Under 35 U.S.C. 154(b), the term of this patent shall be extended for 0 days.

(21) Appl. No.: 09/514,942

(22) Filed: Feb. 28, 2000

Related U.S. Application Data

(63) Continuation-in-part of application No. PCT/EP98/05846, filed on Sep. 15, 1998.

(30) Foreign Application Priority Data

Oct. 7, 1997 (DE) ............................................. 197 44 180

(51) Int. Cl.[7] ................................................... H05B 6/68
(52) U.S. Cl. .......................... 219/702; 219/700; 219/746; 219/748; 219/761

(58) Field of Search .................................. 219/702, 710, 219/700, 701, 745, 746, 748, 750, 761, 762

(56) References Cited

U.S. PATENT DOCUMENTS

| 3,867,606 | * | 2/1975 | Peterson ................................ 219/748 |
| 4,839,485 | * | 6/1989 | Koch et al. ........................... 219/700 |
| 4,963,709 | * | 10/1990 | Kimrey, Jr. .......................... 219/710 |
| 5,245,150 |   | 9/1993 | Grandi . |

FOREIGN PATENT DOCUMENTS

| 9-112873 | 5/1997 | (JP) . |
| WO 99/18758 | * 4/1999 | (WO) . |

* cited by examiner

*Primary Examiner*—Philip H. Leung
(74) *Attorney, Agent, or Firm*—Klaus J. Bach

(57) ABSTRACT

In an apparatus for the selective heating of foods disposed on a serving tray to serving temperature by means of a microwave oven having a gyrotron as a heat source, individual guide means are provided for guiding the microwave radiation individually to particular dishes on the tray and a control computer controls the radiation of, and the heat generated in, the dishes during passages of the tray with the dishes through the microwave oven.

8 Claims, 1 Drawing Sheet

APPARATUS FOR THE SELECTIVE HEATING OF FOODS DISPOSED ON A TRAY USING A GYROTRON FOR MICROWAVE HEATING OF THE FOODS

This is a continuation-in-part application of international application PCT/EP98/05846 filed Sep. 15, 1998 and claiming the priority of German application 197 44 180.7 filed Oct. 7, 1997.

BACKGROUND OF THE INVENTION

The invention resides in an apparatus for heating foods particularly in an air plane wherein the foods are disposed, ready to be served, on a tray and are moved on the tray through a heating apparatus for heating the food on the tray to 50 to 55° C. before it is served to the passengers.

The hot meals on airplanes are heated today in hot air ovens, in induction ovens or in microwave ovens. However, the apparatus in use are not suitable for a rapid, homogeneous and spacially selective heating of the foods. DE 195 25 878 C1 discloses, for example, a vertical conveyor for the transport of foods on an airplane with two belt systems which move in opposite directions and which engage menu boxes by way of strip-like engagement members extending transversely to the belts. At least one heating apparatus is provided. This apparatus consists essentially of at least one packet of heat inductors, which are pivotable around a vertical axis and which each includes an induction coil and can be pivoted into, an out of, spaces between the menu boxes.

It is the object of the present invention to provide an apparatus for the selective heating of foods by which a multitude of menus can be heated properly and immediately before serving in order to provide for an as uniform as possible supply of the food to all the passengers especially of a jumbo jet.

SUMMARY OF THE INVENTION

In an apparatus for the selective heating of foods disposed on a serving tray to serving temperature by means of a microwave oven having a gyrotron as a heat source, individual guide means are provided for guiding the microwave radiation individually to particular dishes on the tray and a control computer for controlling the radiation of, and the heat generated in, the dishes during passages of the tray with the dishes through the microwave oven.

With the method according to the invention the foods can be heated to predetermined serving temperatures in a fast, selective and uniform manner whereby not only the processing times and the energy consumption can be substantially reduced but, at the same time, the quality of the menu being served can be improved. The microwaves used in a preferred embodiment of the invention for heating the food have preferably a frequency greater than about 24 GHz, that is, they are much above the plane-related aviation frequency so that air plane traffic is not disturbed by the microwave ovens. The used millimeter waves provide for good coupling of energy into the foods. The radiation enters the foodstuff directly from the outside without any bypasses. The food particles are subjected to vibrations, whereby heat is generated by friction within the foodstuff itself so that all the food irradiated is heated. Heating occurs in seconds. A rapid automatic heating of the meals in jumbo jets can therefore be achieved without problems.

In a further embodiment according to the invention, which is particularly advantageous, the foodstuff on the tray can be selectively heated by a computer-controlled focussing of the beam-guided high frequency microwaves generated by the gyrotron in the microwave oven. That is, if the tray contains various foods requiring different heating, they can be selectively heated to the desired temperature while other foodstuff is not heated at all.

In further embodiments of the invention, the microwave oven is part of a processing line, which extends through the microwave oven and includes means for homogenizing the heated food on the tray. The processing arrangement may include additional microwave ovens for treating the food on the trays by high-frequency millimeter waves by means of at least one hollow conductor system for uncoupling the waves. (The walls of the hollow conductor systems are coated so as to absorb any scattered radiation). The radiation is piped by the hollow conductor system directly to the respective dishes using a mirror system including at least one mirror, whereby the foods on the tray can be very selectively heated. The trays may have reflection layers below the dishes to be heated so that any microwaves passing through the dishes are reflected back into the dishes. Sensors for determining the temperature of the respective dishes may also be provided. The control computer preferably reads the desired food temperature from bar codes so that the heating of the dishes can be automatically controlled in a menu-specific manner. By way of the control computer, the optical axis and the focussing properties are adjustable by adjustment means for the mirrors as well as the focussing properties of the beam to be coupled into the food.

Below, the invention will be described in greater detail on the basis of the accompanying drawings.

DESCRIPTION OF A PREFERRED EMBODIMENT

Figure 1:
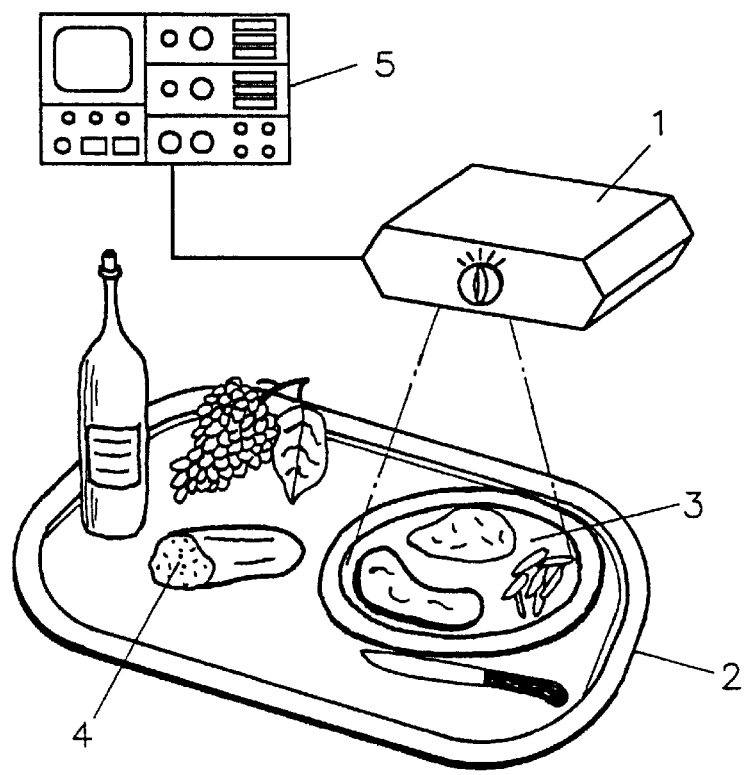
FIG. 1 shows in principle a handling arrangement for heating a menu.

As shown in FIG. 1, a number of dishes 4 are disposed on a tray 2 of which only the meat dish 3 is to be heated to a temperature of preferably 50 to 55° C. for consumption. The microwave 1 includes a gyrotron, which operates above about 24 GHz in a continuous fashion. The gyrotron radiation has an intensity, which is easily adjustable and has a homogeneous power output density. For controlling the microwave oven 1, a control computer 5 is provided. The food treatment may be controlled manually, half-automatically or as a fully automatic catering service. The radiation intensity and the area to be heated may be pre-selected. The components of the apparatus, which are not shown in the drawings are a power supply, tray supply and removal arrangements and a sensor system for sensing the operating parameters for the operation of the arrangement. There may be, for example, sensors for sensing the temperature of the dishes being heated whose values are supplied to the control computer 5 for automatically controlling the heating of a particular menu.

The microwave oven 1 is preferably part of a processing line which includes at least one transport module, which is connected to the microwave oven 1, but is not shown in the drawings—for homogenizing the heated dishes 3 and through which the dishes disposed on the tray 2 pass. Several microwave ovens may be associated with the transport modules so that a large number of food trays can be heated in a relatively short time for supplying the large number of passengers in large wide-body airliners.

Figure 2:
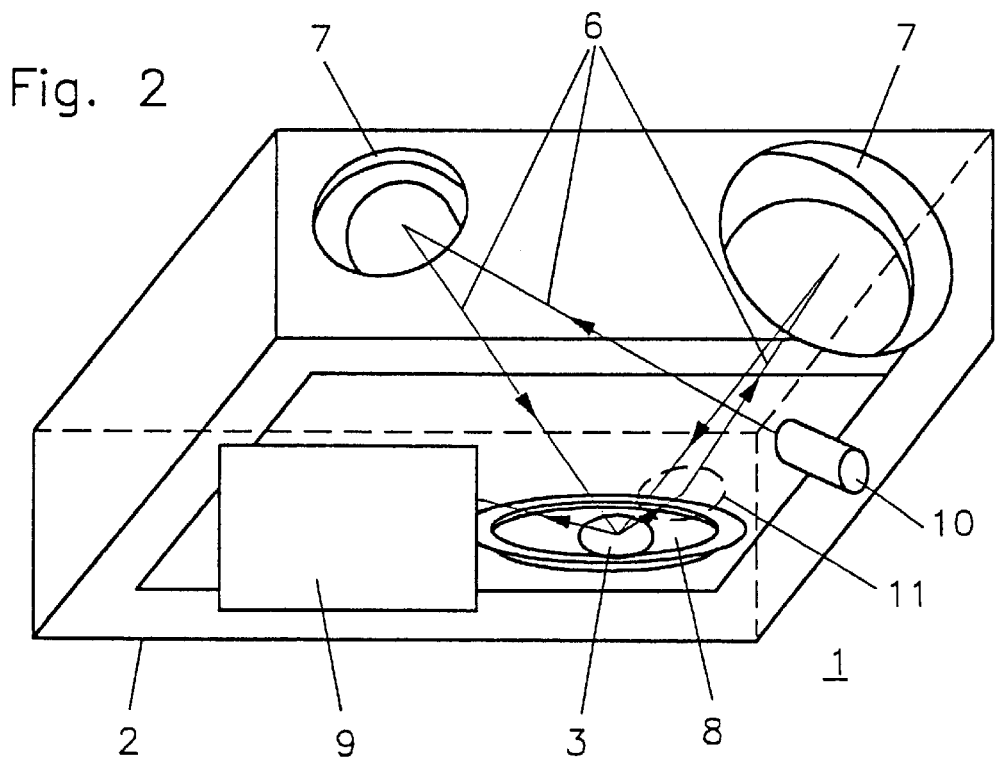
FIG. 2 shows an apparatus (microwave oven) for selectively heating the foods on a tray.

The application module shown in FIG. 2 uncouples the high frequency millimeter waves provided by a gyrotron in-coupling structure 10 by way of a hollow conductor system not shown in the drawings. The millimeter wave 6 uncoupled from the microwave transmission system are directed, by way of a mirror system 7 onto a tray 2, on which the dishes 3 are disposed and below which a microwave reflecting layer 8 is disposed for heating the dish disposed thereon.

The mirror system 7 as shown in FIG. 2 includes two mirrors whereby the menu can be heated uniformly at the same time from two sides. However, more mirrors may be provided. Subsequently, the microwaves 6 are fully dissipated in a microwave absorbing layer 9.

The invention is of course not limited for use in airplanes. Rather menus can be heated in this way also on passenger ships, in railroads or large kitchen facilities.

What is claimed is:

1. An apparatus for the heating of foods disposed on a serving tray to a serving temperature of 50 to 55° C., comprising a microwave oven having a gyrotron generating high-frequency millimeter wave radiation as a heat source, individual guide means for guiding said microwave radiation individually to particular dishes disposed on said tray for a homogeneous controlled irradiation of the dishes by said high frequency millimeter wave radiation generated by said gyrotron, and a control computer for a selective, computer-controlled focussing of the high frequency radiation supplied to, and thereby the heat generated in, different dishes on said tray during passage of said tray with said dishes through said microwave oven.

2. An apparatus according to claim 1, wherein said microwave oven gyrotron includes modulating tubes for generating millimeter waves having a frequency greater than 24 GHz.

3. An apparatus according to claim 1, wherein the microwave oven is part of a food processing line which includes at least one transport module for homogenizing the heated dishes when the trays with the dishes disposed thereon move along said processing line.

4. An apparatus according to claim 3, wherein said food processing line includes additional microwave ovens, which are associated with said transport module.

5. An apparatus according to claim 1, wherein the high frequency millimeter waves provided by said gyrotron are uncoupled into said oven by at least one hollow conductor system and are then directed onto particular dishes to be heated by a mirror system including at least one mirror.

6. An apparatus according to claim 5, wherein, below the dishes to be heated, said tray is provided with a microwave reflecting layer.

7. An apparatus according to claim 1, wherein sensors are provided for determining the temperatures of the dishes being heated and said control computer controls the power supplied depending on the temperatures sensed.

8. An apparatus according to claim 1, wherein said means for guiding said microwave radiation includes mirrors and control means for adjusting the mirrors to control the optical axis and focussing properties of the microwave radiation.

* * * * *